United States Patent [19]

Kubo

[11] 4,172,790
[45] Oct. 30, 1979

[54] DIAPHRAGM-CONTAINING TYPE FILTER PRESS

[75] Inventor: Masayoshi Kubo, Nagasaki, Japan

[73] Assignee: Mitsubishi Jukogyo Kabushiki Kaisha, Tokyo, Japan

[21] Appl. No.: 829,861

[22] Filed: Sep. 1, 1977

[51] Int. Cl.² .................. B01D 25/12; B01D 25/04
[52] U.S. Cl. .................................. 210/137; 210/224; 210/227
[58] Field of Search ............... 210/224, 225, 226, 227, 210/228, 229, 97, 137; 100/116, 211

[56] References Cited

U.S. PATENT DOCUMENTS

| 2,849,121 | 8/1958 | Burwell | 210/226 |
| 3,098,429 | 7/1963 | Hagglund | 210/226 |
| 3,695,440 | 10/1972 | Mori | 210/225 |
| 3,968,039 | 7/1976 | Inujima et al. | 210/225 |

FOREIGN PATENT DOCUMENTS

| 2034123 | 7/1970 | Fed. Rep. of Germany | 210/224 |
| 2503674 | 7/1975 | Fed. Rep. of Germany | 210/224 |

Primary Examiner—Charles N. Hart
Assistant Examiner—David R. Sadowski
Attorney, Agent, or Firm—Wenderoth, Lind & Ponack

[57] ABSTRACT

A filter press for filtering a slurry in which there are a plurality of filter frames movable toward and away from each other and in which at least one movable pressure plate is positioned between each pair of filter frames. The pressure plate and filter frames form a filter chamber on each side of the pressure plate. This pressure plate is a combination of a partition plate positioned between the filter frames and frame members on opposite sides of the partition plate adjacent the filter frames. The frame members and filter frames have an open space thereinbetween which defines the filter chamber. The pressure plate also has a plurality of diaphragm members, one member on each side of the partition plate between the frame member and the partition plate. The diaphragm members and the partition plate have interstices thereinbetween. Further provided are a slurry nozzle inserted into the filter chamber for directing slurry thereinto and a slurry feed supply connected to the nozzle which supplies slurry thereto at a predetermined pressure. A water supply source provides compressed water at a predetermined pressure and is connected to the interstices between the diaphragm member and the partition plate. A pressure adjustment device is connected between the slurry supply and the compressed water supply in order to maintain pressure of the compressed water provided to the interstices at a pressure lower than the pressure of the slurry supplied into the filter chamber.

3 Claims, 2 Drawing Figures

DIAPHRAGM-CONTAINING TYPE FILTER PRESS

The present invention relates to a diaphragm-containing type filter press in which a thickness of a filter frame forming a filter chamber is made thin and thereby an overall length of the machine is shortened and a weight of the machine is lightened.

BACKGROUND OF THE INVENTION

A filter press is a filter machine that is industrially most widely used at present because of its various advantages. For example, the structure is simple, rugged and is rarely damaged; the machine is easy to handle, and a high filtering pressure can be obtained. A general structure of a diaphragm containing type filter press that is one of the filter presses, is shown in FIG. 1. By way of explaining the structure of this diaphragm-containing type filter press, taking the directions X—X in FIG. 1 as back and forth directions for convenience, fixed plates 3 and 4 are supported respectively on two pedestals 1 and 2 disposed at the front and rear positions and are separated by a predetermined interval. These fixed plates 3 and 4 are connected by a plurality of connecting plates 5. On the connecting plates 5 are mounted a plurality of filter frames 6 so as to be movable in the forward and backward, and on one side of these plurality of stacked filter frames 6, a movable plate 7 is mounted on the connecting plates 5 and also is movable in the backward and forward directions. Fixedly secured to the movable plate 7 is a tip end of a ram 9 of a hydraulic cylinder 8 assembled in the fixed plate 4, so that the movable plate 7 can be driven back and forth by the cylinder 8. The movable plate 7 and the filter frames 6 are connected as by linkage mechanisms (not shown), so that in response to the movement of the movable frame 7 the filter frames 6 may move along the connecting plates 5 with an appropriate interval maintained therebetween. When the filter frames 6 are urged against the fixed plate 3, filter chambers surrounded by filter cloths provided on the filter frame 6 are formed between the respective filter frames 6.

In such a diaphragm-containing type filter press, after the filter frames 6 have been compressed and fastened, at first slurry, that is, a liquid to be processed within the filter chamber, is fed and filtered under pressure for a predetermined period of time, thereafter, the feeding of the slurry is stopped. Subsequently, pressurized water is fed into an interstice between an inflatable diaphragm, such as a rubber sheet or the like, extended over the surface of the filter frame 6 and that filter frame surface to compress and filter the slurry. Finally a dehydrated cake formed within the filter chamber is taken out by opening the filter frames. Upon feeding the slurry, however, a pressure difference is liable to arise between the respective filter chambers because of a difference in concentration of the slurry, contamination of the filter cloths and other causes. This is especially the case when the slurry is liable to be mixed with foreign matters, for example the supply water mud, sewage water mud, or the like. In these instances the feed port for the filter chamber may be blocked by foreign matters, and consequently, the pressure of the slurry feed pump acts upon the partition walls of the filter frames forming the filter chamber as a pressure difference. If a pressure difference occurs between the filter chambers, the partition wall of the filter frame will bend to the side of the filter chamber having a lower pressure, resulting in deformation of the filter frame and damage to the filter cloth. In order to prevent such deformation and damage, heretofore, the wall thickness of the partition wall of the filter frame was made very thick, but as a result, the weight of the machine became heavy, the machine length became long, and a large foundation for the machine was necessary.

SUMMARY OF THE INVENTION

One object of the present invention is to eliminate the above-described shortcomings of the prior art filter machines.

Another object of the present invention is to provide a diaphragm-containing filter press in which, by mitigating a slurry pressure acting upon a partition wall of a filter frame for a filter chamber into which slurry is being poorly fed upon feeding the slurry to said filter press, a thickness of the filter frame is thinner the machine length is shortened; and the weight of the machine is lightened.

According to one embodiment of the present invention, there is a diaphragm-containing type filter press in which there are a plurality of filter frames stacked on each other so as to be freely brought into tight contact with or separated from each other. A recess for providing a filter chamber is formed on the surface of each filter frame and, a filter cloth is provided on the surface of each said filter frame. When the filter frames are brought into tight contact to each other, slurry is fed into the filter chamber formed between the filter cloths of one of adjacent filter frames and the other frame to filter the slurry. The filter press is characterized in that a diaphragm is mounted between at least one of mutually opposed filter cloths mounted on adjacent filter frames and the surface of the corresponding filter frame; a flow path for feeding a compressed liquid to the interstice between the diaphragm and the surface of the filter frame is formed in the filter frame; and a control valve for controlling the pressure of the compressed liquid is provided in the flow path so that during the feeding of the slurry into the filter chamber the compressed liquid may be fed through the flow path as controlled to have a pressure lower than the pressure of the slurry, whereby the compressed liquid can apply such pressure to the filter frame that it may offset a deformation of the filter frame caused by a pressure difference between the adjacent filter chambers located on the opposite sides of the filter frame.

BRIEF DESCRIPTION OF THE DRAWINGS

The above-mentioned and other features and objects of this invention will become more apparent by reference to the following description taken in conjunction with the accompanying drawings, in which.

DETAILED DESCRIPTION OF THE INVENTION

Figure 1:
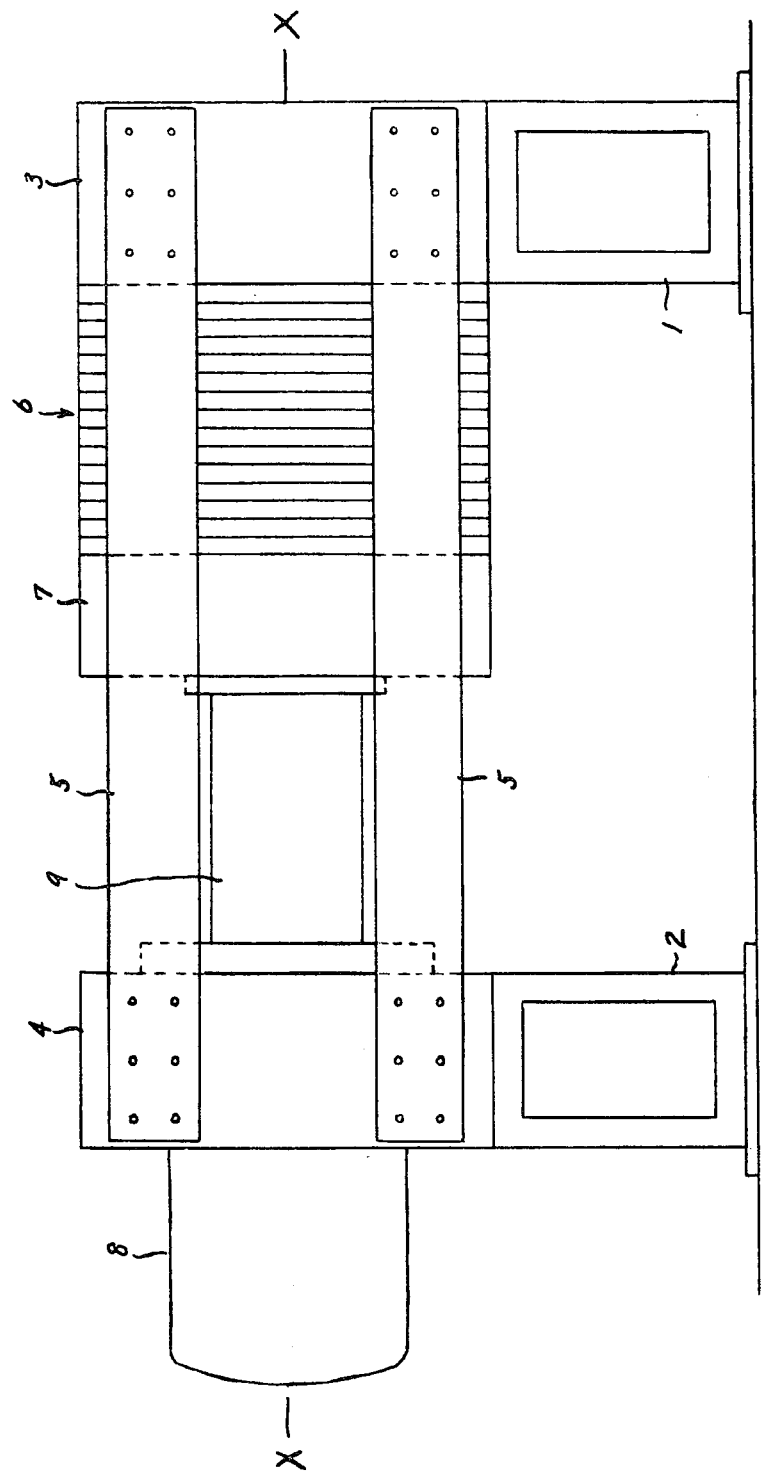
FIG. 1 is a side view showing a general structure of a diaphragm-containing type filter press in the prior art.

Referring now to the drawings, the basic structure of this diaphragm-containing type filter press is similar to that of the filter press in the prior art illustrated in FIG.

Figure 2:
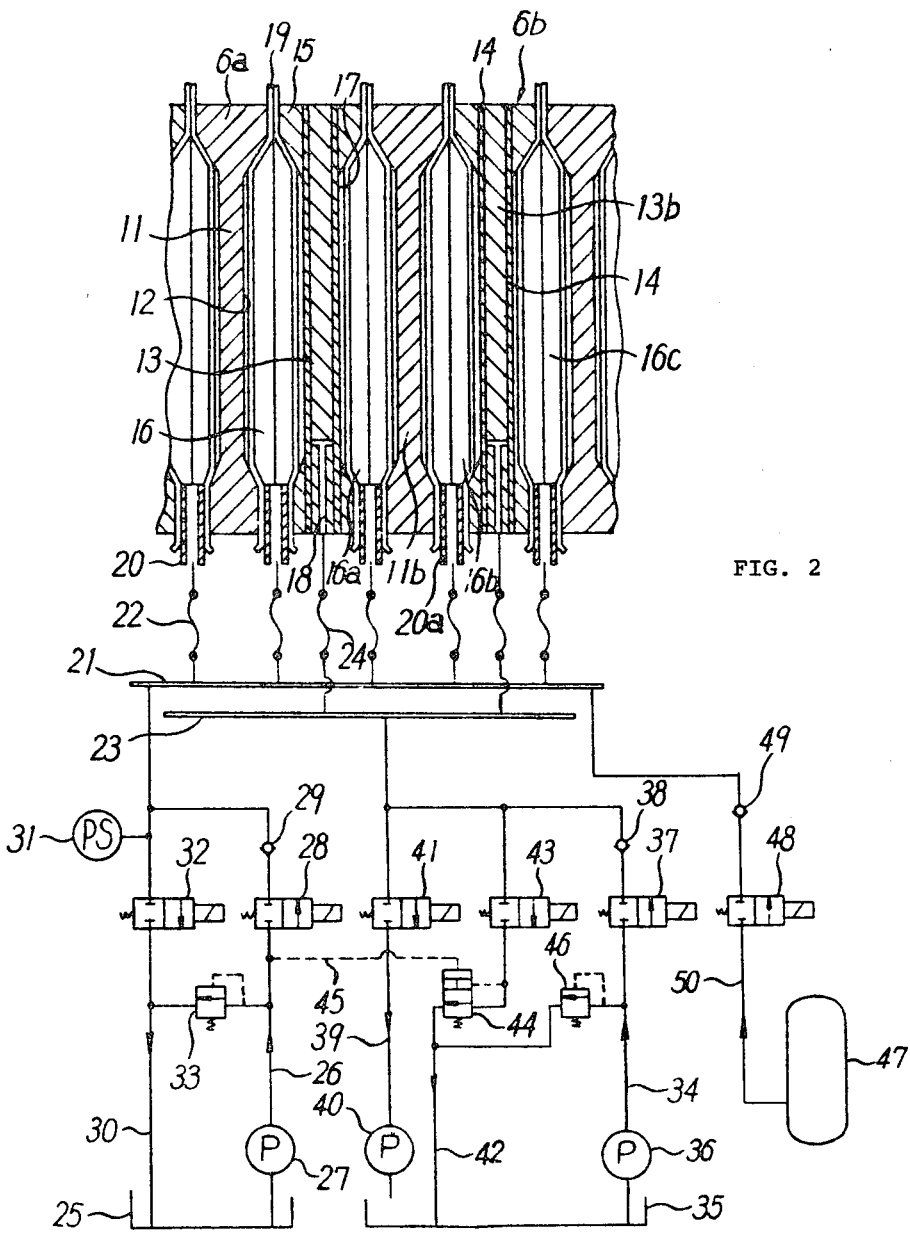
FIG. 2 is a partial cross-section view associated with a hydraulic circuit diagram showing one preferred embodiment of a diaphragm-containing type filter press according to the present invention.

1, and so, a further description thereof will be omitted here. With regard to one preferred embodiment of the present invention, a partial cross-sectional view of a diaphragm-containing type filter press according to the present invention in the state where the filter frames are closed is shown in FIG. 2 jointly with a hydraulic circuit diagram of a hydraulic circuit for feeding slurry, compressed water, and the like. The preferred embodiment will be described on the basis of FIG. 2 and also with reference to FIG. 1. The illustrated embodiment is of the type where the diaphragms are mounted on the opposite surfaces of each one of every other filter frames.

In FIG. 2, filter frames 6a and water pressure plates 6b disposed alternately on the connecting plates (omitted from illustration, see FIG. 1) are in a closed state. A peripheral portion of the filter frame 6a is made thick so as to form a recess on the surface of the filter frame 6a, and a thin portion thereof serves as a partition wall 11 forming a side wall of the filter chamber. On the surface of the partition wall 11 are filtering paths 12 formed in a striped pattern, so that a filtered liquid may flow through the filtering paths 12, and it is led to the outside of the machine through a path not shown leading to one end of the filter frame 6a. The water pressure plate 6b disposed alternately with the filter frames 6a consists of; a partition plate (partition wall) 13 opposed to the partition wall 11 of the filter frame 6a; inflatable diaphragms 14 made of rubber sheets or the like covering the opposite surfaces of the partition plates 13; and frames 15 mounted on the opposite sides of the partition wall 13 covered by the diaphragms 14 by means of bolts. Though the water pressure plate 6b serves to form a filter chamber 16 similar to the filter frame 6a, in order to distinguish it from the filter frame 6a on the basis of the above-described construction, it is differently called "water pressure plate 6b". The above-referred frames 15 serve to fixedly secure the diaphragm 14 onto the partition wall 13 along its periphery to maintain air-tightness along the outer periphery of the diaphragm 14, and the frames 12 also serve to determine the size of the filter chamber 16 formed between the filter frame 6a and the water pressure plate 6b. On the surface of the diaphragm 14 on the side of the filter chamber 16 are filtered liquid paths 17, so that the filtered liquid flows through the filtered liquid path 17 and is led out of the machine through a passageway not shown in FIG. 2. On the partition plate 13 of the water pressure plate 6b compressed water flow paths 18 are formed which communicate with interstices between the diaphragms 14 provided on the opposite sides of the partition plate 13 and the respective surfaces of the partition plate 13 so that compressed water may be fed into these interstices between the partition plate 13 and the respective diaphragms 14. Between each filter frame 6a and adjacent water pressure plate 6b a filter cloth 19 is interposed and folded doubly. The filter chamber 16 is surrounded by this filter cloth 19. At one end portion of the filter frame 6a a slurry feed nozzle 20 is inserted for feeding slurry into the filter chamber 16 between the filter cloths 19. Each slurry feed nozzle 20 is connected to a slurry feed header 21 through a flexible hose 22, and the above-referred compressed water flow paths 18 are also connected respectively to a compressed water header 23 through respective flexible hoses 24. The slurry feed header 21 is connected to a slurry tank 25 via slurry feed piping 26. In the slurry feed piping 26 a slurry feed pump 27 is provided for pumping the slurry to be fed into the filter chamber 16 from the slurry tank 25; a switching valve 28 is provided for opening and closing the slurry feed piping 26; and a check valve 29 is provided for preventing the slurry flowing through the piping 26 from reversely flowing. In addition, the slurry feed piping 26 is connected to another piping 30 leading to the slurry tank 25. In the latter piping 30 a pressure switch 31 for determining the pressure of the slurry fed to the slurry feed header 21 and a switching valve 32 for opening and closing the piping 30 are provided. Between the slurry feed piping 26 and the piping 30 is a relief valve 33, so that the pressure of the slurry being fed is controlled so as not to exceed a predetermined pressure. The compressed water header 23 is connected to a compressed water tank 35 through a compressed water feed piping 34. Included in the compressed water feed piping 34 are a compressed water feed pump 36 for pumping the compressed water, a switching valve 37 for opening and closing the piping 34, and a check valve 38 for preventing the compressed water from reversely flowing. In addition, another piping 39 leading to the compressed water tank 35 is connected to the compressed water feed piping 34, and in the piping 39 are a vacuum pump 40 for extracting the compressed water in the interstices between the diaphragms 14 and the corresponding partition plates 13 in a short period of time, and a switching valve 41 for opening and closing the piping 39. Connected to the compressed water feed piping 34 is another piping 42 leading to the compressed water tank 35, and in the piping 42 are a switching valve 43 and a pressure difference control valve 44. This pressure difference control valve 44 is connected via a pilot tube 45 to the slurry feed piping 26 so as to establish a pressure that is lower by a predetermined pressure than the pressure of the slurry being fed into the filter chamber 16 through the slurry feed piping 26. This way the pressure of the compressed water being fed through the compressed water feed piping 34 can be controlled to have a pressure lower, by the aforementioned predetermined pressure, than the pressure of the slurry. Between the compressed water feed piping 34 and the above-referred piping 42 is another relief valve 46, so that the pressure of the compressed water being fed to the compressed water header 23 is controlled not to exceed a predetermined pressure. The slurry feed header 21 is also connected to a compressed air tank 47 through a compressed air feed piping 50 including a switching valve 48 and a check valve 49.

The above description is the construction of the preferred embodiment of the present invention illustrated in FIG. 2. However, associated devices such as drive power sources for driving the respective pumps and control devices therefor and control devices for automatic valves serving as the switching valves, if used, are omitted from illustration in FIG. 2.

The operation of the illustrated embodiment after the press has been closed is described hereunder.

When the filter frames 6a and the water pressure plates 6b have been compressed and fastened by moving the movable plate 7 (See FIG. 1) and thus the press has been brought into a closed state, the slurry feed pump 27 is operated, the switching valve 28 provided in the slurry feed piping 26 and the switching valve 43 provided in the piping 42 are opened at the same time. The slurry in the slurry tank 25 beings to flow through the slurry feed piping 26, slurry feed header 21 and the flexible hoses 22 and is fed into the respective filter chambers 16.

As soon as the pressure of the slurry reaches the preset pressure that is preset at the pressure switch 31, the switching valve 37 provided in the compressed water feed piping 34 is opened, and owing to the operation of the compressed water feed pump 36, the compressed water is fed into the interstices between the diaphragms 14 of the filter chambers 16 and the partition plates 13. However, since the pressure of this compressed water is controlled so as to be lower by the pressure difference preset in the pressure difference control valve 44 than the pressure of the slurry fed into the filter chamber 16, in practice, the compressed water is fed only into the interstices between the diaphragm 14 and the partition plate 13 on the side of the filter chamber 16 that is being poorly fed with the slurry. In this embodiment, a modification could be made such that a constant volume type pump is used as the slurry feed pump and the switching valve 37 in the compressed water feed piping 34 may be switched in response to a timer instead of the pressure switch 31.

If the pressure of the slurry is further raised, the relief valve 33 between the slurry feed piping 26 and the piping 30 operates, and thereby the pressure of the slurry is kept constant to continue the filtering operation. However, it is to be noted that if a vortex type pump is used as the slurry feed pump 27, or if a system of automatically varying a rotational speed of a constant volume type pump so as to maintain its delivery pressure constant is employed, then the above-described relief valve 33 can be omitted. With regard to the relief valve 46 also, it can be omitted depending upon the type of the pump 36.

After the filtering has been effected for a predetermined period, the switching valves 28 and 43 are closed to enter a compression step. In this case, the slurry feed pump 27 could be stopped. The compression of the slurry is effected by compressing the filtered slurry that is accumulated within the filter chamber 16 by means of the diagrams 14 which can be inflated by feeding the compressed water.

When the compression step has been finished, the switching valve 37 provided in the compressed water feed piping 34 is closed, while the switching valve 32 provided in the piping 30 and the switching valve 48 provided in the compressed air feed piping 50 are opened to effect blowing of the slurry remaining in the pipings. When an automatic switching valve is used, the detection of the switching time is carried out relying upon a timer and/or detection of the amount of the filtered liquid. It is to be noted that simultaneously with the blow-off through the pipings, a switching valve 41 provided in the piping 39 is opened and the vacuum pipe 40 is operated to effect extraction of the compressed water in the interstices between the diaphragms and the corresponding partition plates 13.

After completion of the air blow with compressed air and the extraction of the compressed water, all the switching valves are closed, and then the press is opened to remove the cake remaining in the filter chamber 16. Thus, one cycle of operation is finished. During this step the respective pumps could be stopped.

Now let us compare the diaphragm-containing type filter press according to the present invention as described above with the similar filter press in the prior art. If a pressure difference arises between the respective filter chambers 16 due to blocking of the flexible hoses for feeding the slurry into the filter chambers 16 and blocking of the slurry feed nozzle 20 or due to variation of the slurry concentration, then the partition wall 11 of the filter frame 6a and the partition plate 13 of the water pressure plate 6b will be subjected to a surface pressure, so that the partition wall and the partition plate 13 would be bent into a dish shape. Here, three successive filter chambers in FIG. 2 are designated by numerals 16a, 16b and 16c. Where the slurry feed nozzle 20a for feeding the filter chamber 16b has been completely blocked in the prior art filter press in which compressed water is not injected during the feeding of the slurry, since the filter chamber 16b is kept vacant while the filter chambers 16a and 16c on the opposite sides of the filter chamber 16b are fed with the slurry at a preset pressure of the relief valve 33, the prior art filter press is designed so that the thickness of the partition wall 11 and the partition plate 13 may be thick enough to bear against the maximum slurry feed pressure, as described previously. However, in the above-described diaphragm-containing filter press according to the present invention, even if the slurry feed nozzle 20a for the filter chamber 16b should be blocked, the pressure difference between the filter chamber 16b and the adjacent filter chamber 16a or 16c would not exceed the sum of the preset pressure in the pressure difference control valve 44 and the loss pressure caused by the piping resistance when the compressed water is injected into the interstices between the diaphragms 14b and the partition plate 13b for the filter chamber 16b, so that the pressure exerted upon the partition wall 11b and the partition plate 13b is lowered. Thus it is possible to make the thickness of the partition wall 11b and the partition plate 13b very thin.

In addition, a modified embodiment can be contemplated, in which diaphragms are mounted on the partition walls of all the filter frames and the compressed water can be fed into the interstices between the diaphragms and the partition walls.

It is to be noted that during the feeding of the slurry, except for a filter chamber which is being poorly fed with the slurry, the diaphragms are substantially not operated because the pressure of the compressed water is lower than the pressure of the slurry, and therefore, the injection of the compressed water would not affect upon the filtering capability of the filter press at all.

As described above in connection to the preferred embodiment, in the diaphragm-containing type filter press according to the present invention, owing to the fact that the pressure exerted upon the filter frame (which forms a filter chamber that is being poorly fed) with slurry when the slurry is fed can be lowered, the thickness of the filter frames can be made thin; the length of the filter press can be shortened; and also, the weight of the filter press can be greatly reduced.

Since many changes could be made in the above construction and many apparently widely different embodiments of this invention could be made without departing from the scope thereof, it is intended that all the matter contained in the above description or shown in the accompanying drawings shall be interpreted as illustrative and not as a limitation to the scope of the invention.

What is claimed is:

1. A filter press for filtering a slurry comprising:
   a plurality of filter frames movable toward and away from each other;
   at least one movable pressure plate means between each pair of filter frames for forming a filter chamber on each side thereof in cooperation with said filter frames, said pressure plate means being comprised of:

a partition plate between said filter frames, frame members on opposite sides of said partition plate and adjacent said filter frames, said frame members and said filter frames having a space thereinbetween, whereby said filter chamber is formed, a plurality of diaphragm members one on each side of said partition plate between said frame member and said partition plate, said diaphragm member and said partition plate having interstices therebetween;

slurry nozzle means inserted into said filter chamber for directing said slurry into said chamber;

slurry feed means connected to said slurry nozzle means for supplying slurry to said slurry nozzle means at a predetermined pressure;

compressed water feed means connected to said interstices between said diaphragm members and said partition plates for supplying compressed water at a predetermined pressure into said interstices when said slurry is supplied by said slurry feed means and for removing said water from said interstices; and pressure adjustment means connected between said slurry feed means and said compressed water feed means for maintaining the pressure of said compressed water provided to said interstices at a pressure lower than the pressure of said slurry supplied by said slurry feed means.

2. A filter press as claimed in claim 1, further comprising compressed air supply means connected to said slurry feed supply means for blowing said slurry therefrom.

3. A filter press as claimed in claim 1, further comprising filter cloth lining said filter chamber.

* * * * *